US011580876B2

United States Patent
Jain et al.

(10) Patent No.: US 11,580,876 B2
(45) Date of Patent: Feb. 14, 2023

(54) METHODS AND SYSTEMS FOR AUTOMATIC CREATION OF IN-APPLICATION SOFTWARE GUIDES BASED ON MACHINE LEARNING AND USER TAGGING

(71) Applicants: Kalpit Jain, San Jose, CA (US); Kaushal Mehta, Fremont, CA (US)

(72) Inventors: Kalpit Jain, San Jose, CA (US); Kaushal Mehta, Fremont, CA (US)

(*) Notice: Subject to any disclaimer, the term of this patent is extended or adjusted under 35 U.S.C. 154(b) by 86 days.

(21) Appl. No.: 16/600,503

(22) Filed: Oct. 13, 2019

(65) Prior Publication Data

US 2020/0160745 A1    May 21, 2020

Related U.S. Application Data

(63) Continuation-in-part of application No. 16/368,849, filed on Mar. 28, 2019, now abandoned.

(60) Provisional application No. 62/648,944, filed on Mar. 28, 2018, provisional application No. 62/743,547, filed on Oct. 10, 2018.

(51) Int. Cl.
  *G09B 19/00*    (2006.01)
  *G09B 5/02*    (2006.01)
  *G06N 20/00*    (2019.01)
  *G06F 9/451*    (2018.01)

(52) U.S. Cl.
  CPC .......... *G09B 19/003* (2013.01); *G06F 9/453* (2018.02); *G06N 20/00* (2019.01); *G09B 5/02* (2013.01)

(58) Field of Classification Search
  None
  See application file for complete search history.

(56) References Cited

U.S. PATENT DOCUMENTS

| | | | |
|---|---|---|---|
| 10,129,310 B1* | 11/2018 | Brunning | G06F 9/453 |
| 2004/0145601 A1* | 7/2004 | Brielmann | G06F 9/453 |
| | | | 715/708 |
| 2013/0151999 A1* | 6/2013 | Seul | G06F 3/048 |
| | | | 715/762 |
| 2016/0179345 A1* | 6/2016 | Zhao | G06F 3/04817 |
| | | | 715/708 |
| 2018/0232211 A1* | 8/2018 | Maurya | G06F 8/10 |
| 2018/0321807 A1* | 11/2018 | Ward | G06F 9/453 |
| 2018/0349153 A1* | 12/2018 | Brillante | G06F 8/38 |
| 2019/0011997 A1* | 1/2019 | Wisnia | G06F 3/0231 |
| 2019/0026843 A1* | 1/2019 | Kim | G06F 9/453 |
| 2021/0064397 A1* | 3/2021 | Tokudome | G06F 9/453 |

* cited by examiner

*Primary Examiner* — Matthew Ell
*Assistant Examiner* — David V Luu (57) ABSTRACT

In one aspect, A computerized method for implementing a virtualized training session user interface (UI) with respect to a production software UI includes the step of providing a production software application. The method includes displaying a guide on a production software UI. A workflow and a tutorial content of the guide is determined dynamically using one or more specified machine-learning algorithms. The method includes displaying the guide as a set of images with a virtual lab placed on top of each image of the guide. The method includes receiving a user input comprising a learning-related data inside a virtual environment of the guide.

3 Claims, 10 Drawing Sheets

You Learnt "How to Add Opportunity in Salesforce"

Good Job :)

METHODS AND SYSTEMS FOR AUTOMATIC CREATION OF IN-APPLICATION SOFTWARE GUIDES BASED ON MACHINE LEARNING AND USER TAGGING

CLAIM OF PRIORITY

This application claims priority to and incorporates by reference U.S. Provisional Application No. 62/743,547, titled METHODS AND SYSTEMS FOR AUTOMATIC CREATION OF IN-APPLICATION SOFTWARE GUIDES BASED ON MACHINE LEARNING AND USER TAGGING, and filed on 10 Oct. 2018.

This application claims priority to U.S. patent application Ser. No. 16/368,849 filed on Mar. 28, 2019 and titled METHOD AND SYSTEM OF ENTITY INTERACTION HISTORY SIGNATURES. U.S. patent application Ser. No. 16/368,849 claims priority to U.S. provisional patent application No. 62/648,944 filed on Mar. 28, 2018 and titled METHOD AND SYSTEM OF ENTITY INTERACTION HISTORY SIGNATURES.

These patent applications are hereby incorporated by reference in their entirety.

BACKGROUND

Field of the Invention

The invention is in the field of machine learning and more specifically to a method, system and apparatus of an automatic creation of in-application software guides based on machine learning and user tagging.

Description of the Related Art

Enterprises have employees that need to be trained in various software applications. These can include web applications, mobile applications, desktop applications, etc. Training can be time consuming and expensive. Additionally, each time the application is updated, current employees may need to undergo retraining. Accordingly, improvements to software application learning and usage are desired.

BRIEF SUMMARY OF THE INVENTION

In one aspect, A computerized method for implementing a virtualized training session user interface (UI) with respect to a production software UI includes the step of providing a production software application. The method includes displaying a guide on a production software UI. A workflow and a tutorial content of the guide is determined dynamically using one or more specified machine-learning algorithms. The method includes displaying the guide as a set of images with a virtual lab placed on top of each image of the guide. The method includes receiving a user input comprising a learning-related data inside a virtual environment of the guide.

BRIEF DESCRIPTION OF THE DRAWINGS

The Figures described above are a representative set and are not an exhaustive with respect to embodying the invention.

DESCRIPTION

Disclosed are a system, method, and article of automatic creation of in-application software guides based on machine learning and user tagging. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Cloud computing can involve deploying groups of remote servers and/or software networks that allow centralized data storage and online access to computer services or resources. These groups of remote serves and/or software networks can be a collection of remote computing services.

JavaScript Object Notation (JSON) is an open-standard file format that uses human-readable text to transmit data objects consisting of attribute-value pairs and array data types (or any other serializable value). It is noted that in other example embodiments, other alternative standard file formats can be utilized.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

Exemplary Methods and Screenshots

FIGS. 1-13 illustrate an example series of screen shots of an automatic creation of in-application software guides based on machine learning and user tagging, according to some embodiments. The animated GIF can be generated using systems 1700-1800 and processes 1400-1500. More specifically, FIGS. 1-13 illustrate a set of bubble windows associated with a virtualized training session in a SALESFORCE® example.

Figure 1:
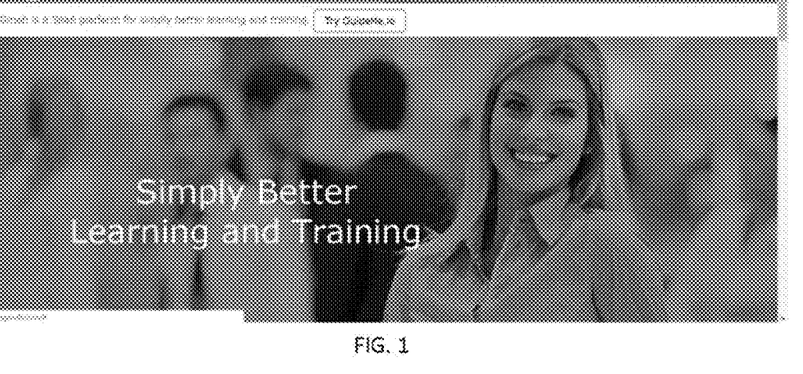
FIGS. 1-13 illustrate an example series of screen shots of an automatic creation of in-application software guides based on machine learning and user tagging, according to some embodiments.
Figure 2:
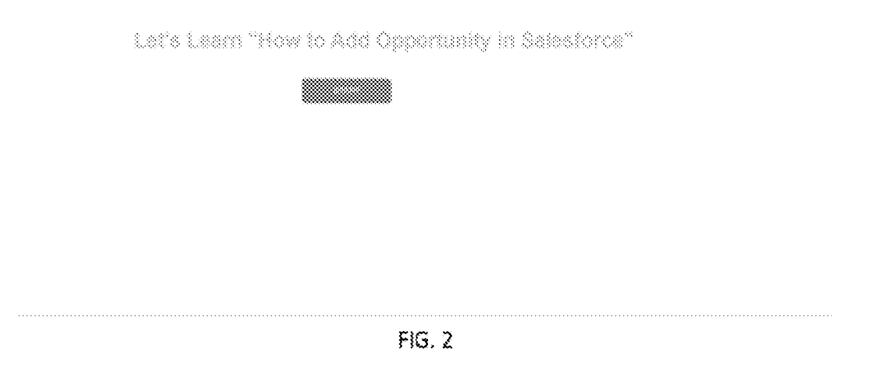
Figure 3:
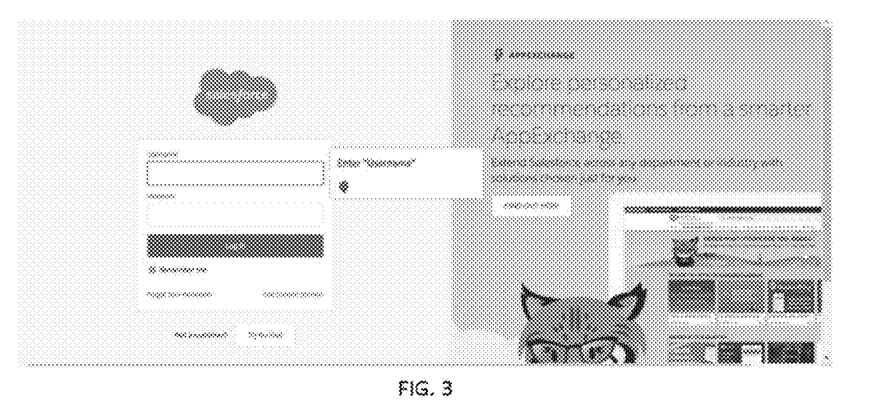
Figure 4:
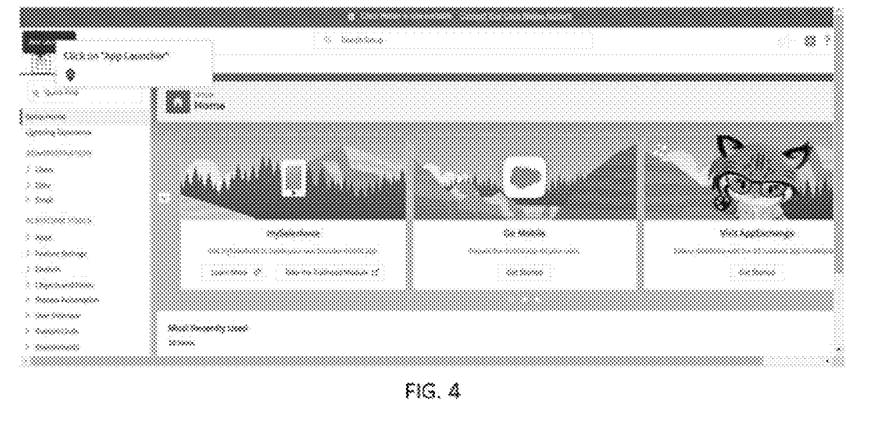
Figure 5:
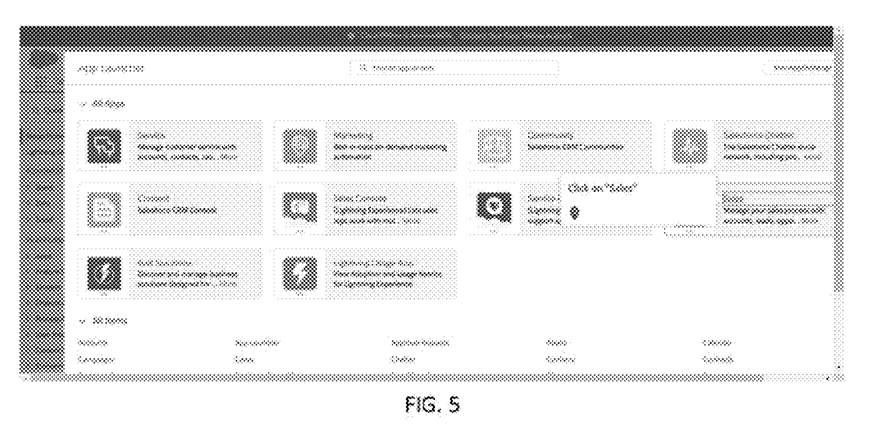
Figure 6:
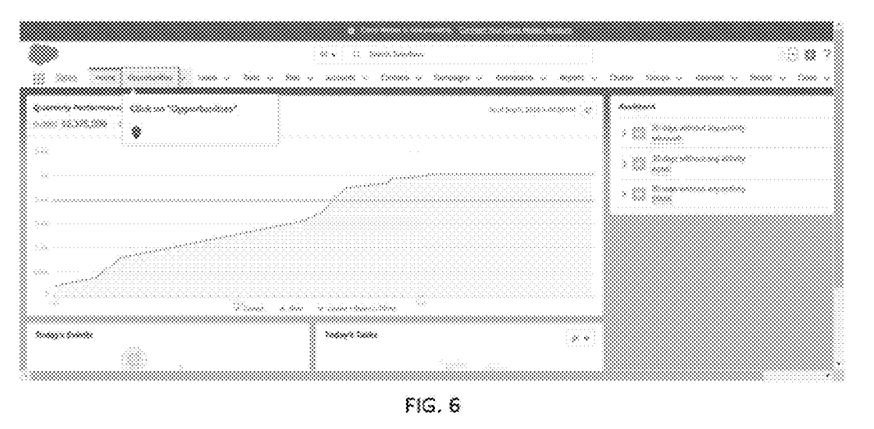
Figure 7:
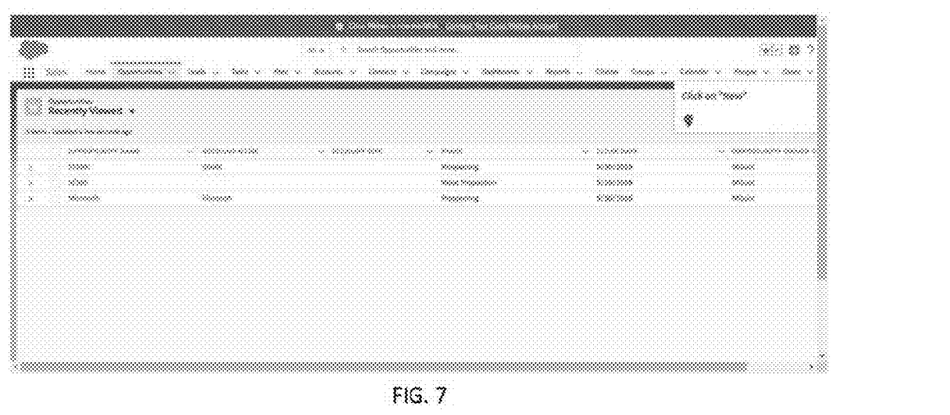
Figure 8:
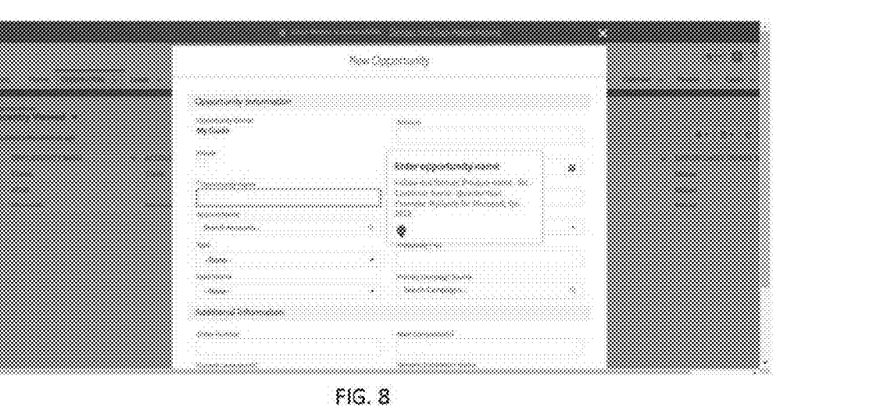
Figure 9:
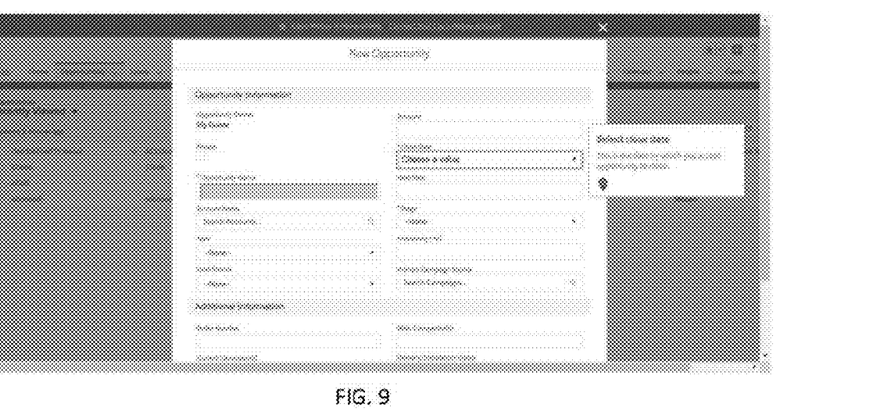
Figure 10:
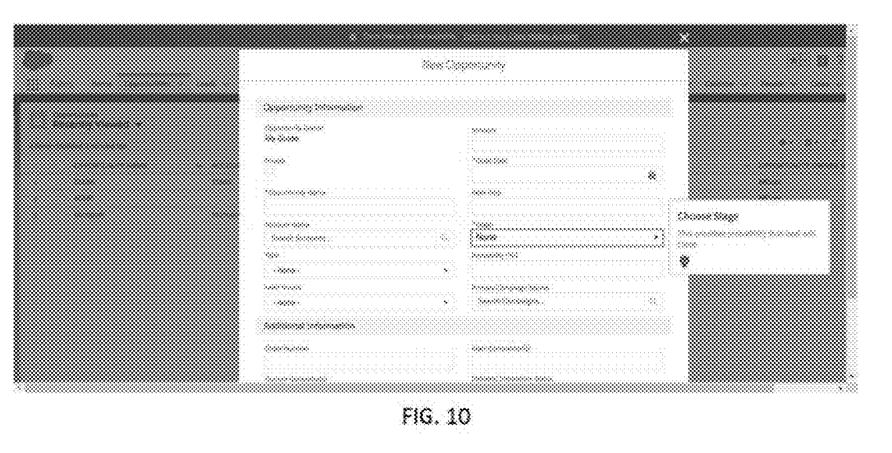
Figure 11:
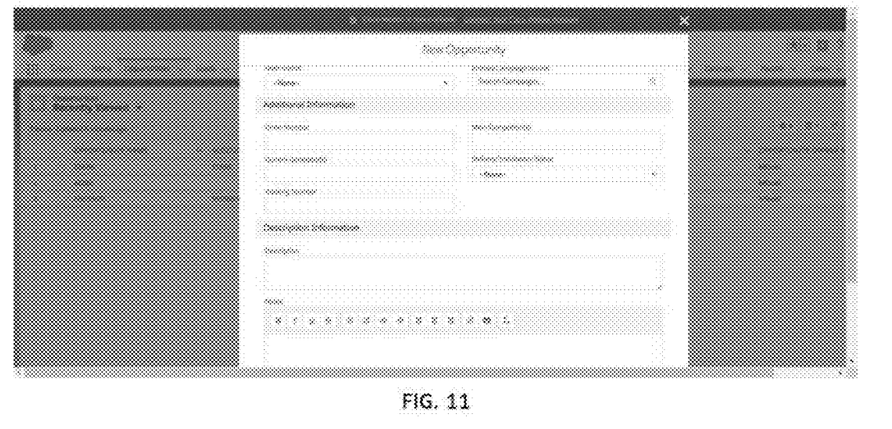
Figure 12:
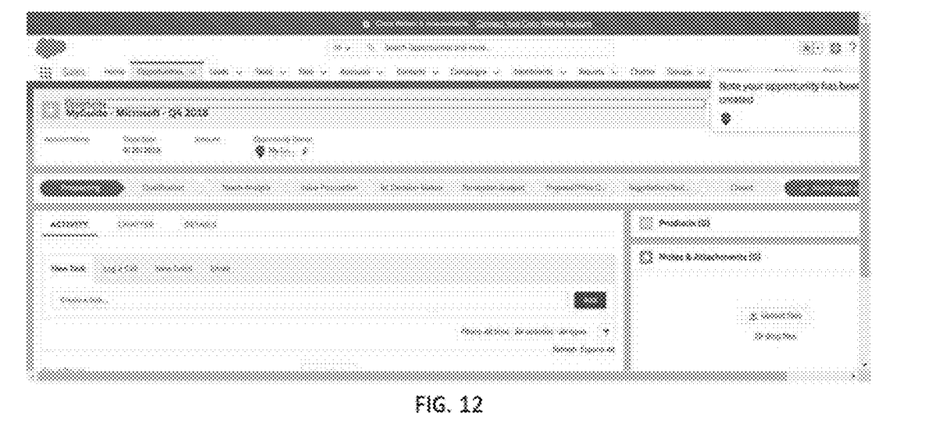
Figure 13:
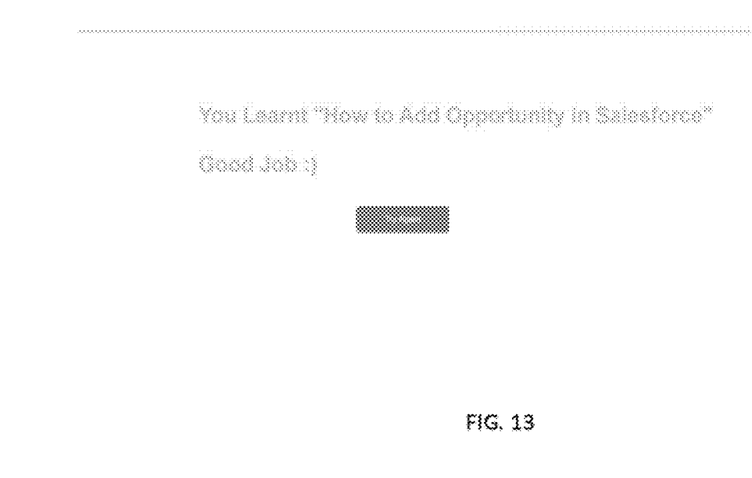
Figure 14:
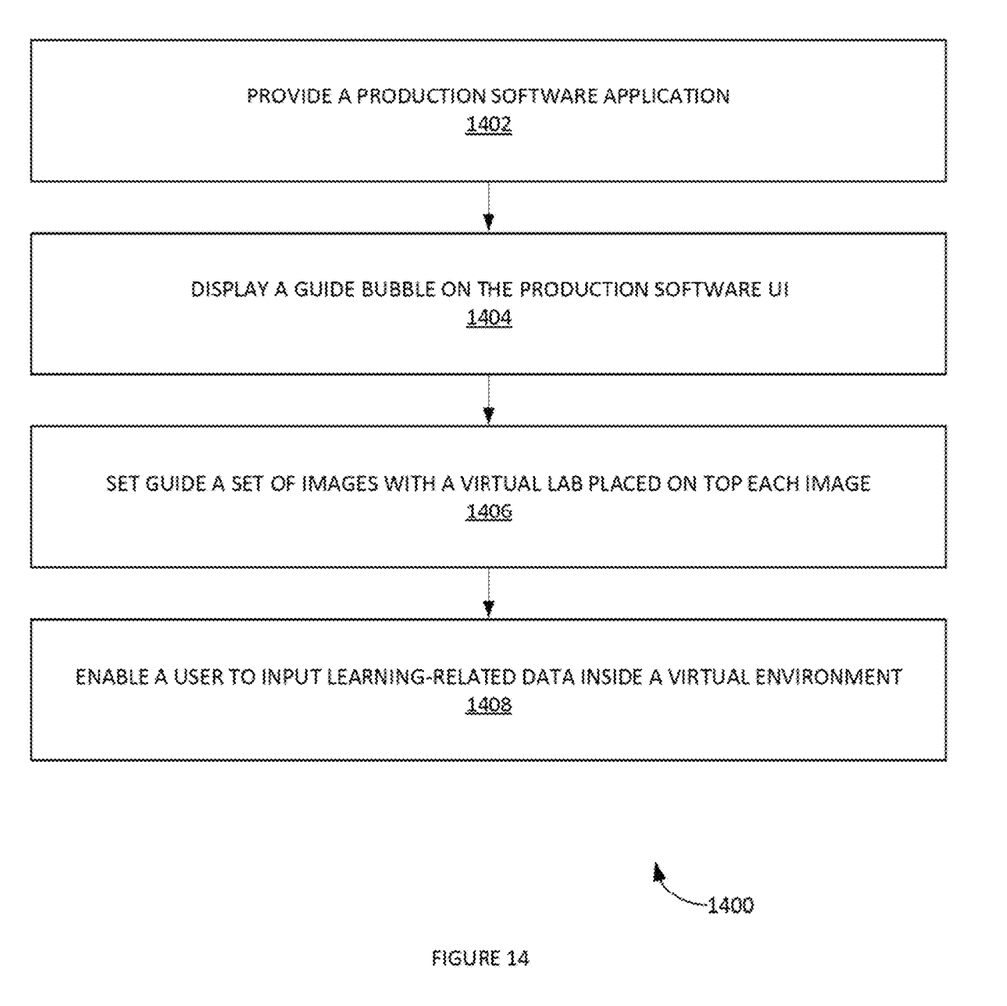
FIG. 14 provides an example process for implementing a virtualized training session UI with respect to a production software UI, according to some embodiments.

FIG. 14 provides an example process 1400 for implementing a virtualized training session UI with respect to a production software UI, according to some embodiments. In step 1402, process 1400 can provide a production software application. In step 1404, process 1400 display a guide (e.g. a bubble window with instructions such as, inter alia: 'click here', 'enter data here', 'do a validation here', etc.) on the production software UI (and/or a virtualized-version of the production software such a virtualized lab (see infra)). The guide provides a workflow and tutorial content via the bubble window. The workflow and/or tutorial content can be determined dynamically using machine-learning algorithms. Example, tutorial content can include specified tasks related to the production software such as, inter alia: how you upload to YOUTUBE®, how to enter a new employee, etc. The guide can be a set of images with a virtual lab placed on top each image in step 1406. Virtual lab can appear like production software, but user impact the product software data. In step 1408, process 1400 can enable a user to input learning-related data inside a virtual environment. The user can also input learning data, do learning validations, etc. FIGS. 1-13 illustrate examples of product software windows, bubble windows and virtual lab windows. Process 1400 can enable a user to learn any type of software flow (e.g. cloud-based software, desktop software, mobile-device software including operating system(s), etc.).

Process 1400 can implement virtualized training with any enterprise software (e.g. SALESFORCE®, ORACLE SPM®, etc.). Process 1400 can be used to train specified users (e.g. new employees, promoted employees, etc.). Process 1400 can be used to provide virtualized training without installing the underlying software that the user is being trained for. In this way, the user can still learn all the relevant UI components, all the pre-validation components, all the workflow components, both in a verbose form (e.g. using guide-me bubbles) and non-verbose forms (e.g. no guide-me bubbles).

Figure 15:
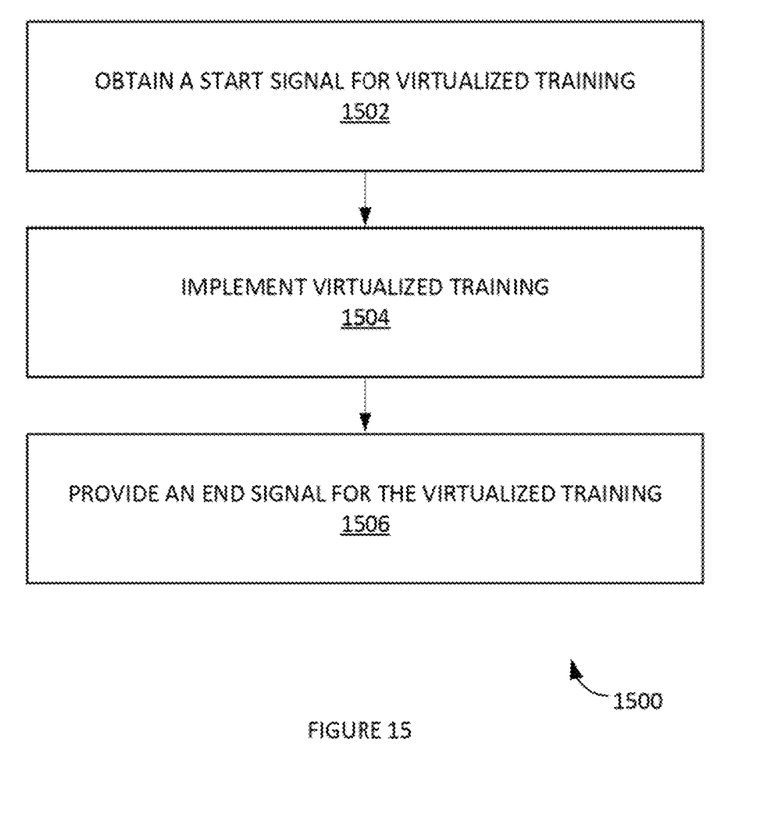
FIG. 15 illustrate an example process flow for a virtualized training session, according to some embodiments.

FIG. 15 illustrate an example process flow 1500 for a virtualized-training session, according to some embodiments. In step 1502, process 1500 can obtain a start signal for virtualized training. implement virtualized training. provide an end signal for the virtualized training. Again, FIGS. 1-13 illustrate an example virtualized-training session based an embodiment of process 1500. The user can receive certifications, promotions, credits, etc. upon completion of a virtualized-training session. Process 1500 can track the user actions in training and provide to an enterprise administrator for further actions (e.g. award the user certifications, update user's enterprise permissions, etc.).

Figure 16:
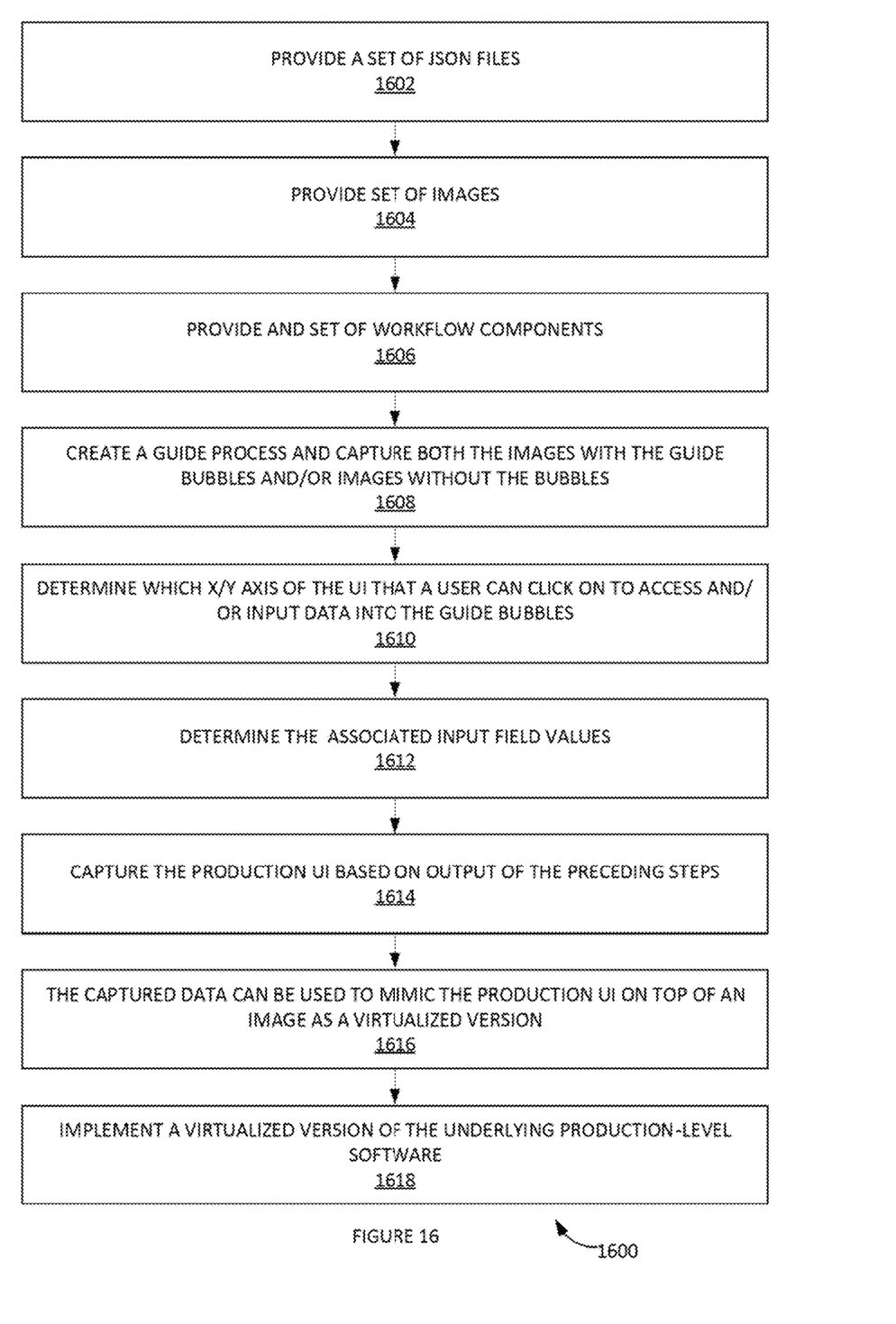
FIG. 16 illustrates an example process of technically implementing a virtualized training session UI, according to some embodiments.

FIG. 16 illustrates an example process 1600 of technically implementing a virtualized training session UI, according to some embodiments. In step 1602 process 1600 can provide a set of JSON files. In step 1604 process 1600 can provide set of images. In step 1606 process 1600 can provide and set of workflow components. In step 1608, process 1600 can create a guide process. To create the guide process, process 1600 can capture both the images with the guide bubbles and/or images without the bubbles. Process 1600 can also implement machine learning algorithms. In step 1610, process 1600 can determine which x/y axis of the UI that a user can click on to access and/or input data into the guide bubbles. In step 1612, process 1600 can determine the associated input field values (e.g. drop-down values, check-box values, etc.). In step 1614, process 1600 can capture the production UI based on output of the preceding steps. In step 1616, the captured data can be used to mimic the production UI on top of an image as a virtualized version. In step 1618, process 1600 can implement a virtualized version of the underlying production-level software (e.g. what is associated with the captured UI but in a virtualized format). Step 1600 can be implemented various platforms/environments such as, inter alia: desktops, mobile-device application, cloud-based software systems. Processes 1400-1600 can be used for virtualization of training on cloud-computing platforms, desktop applications, mobile-device software, etc.

Example Systems

Figure 17:
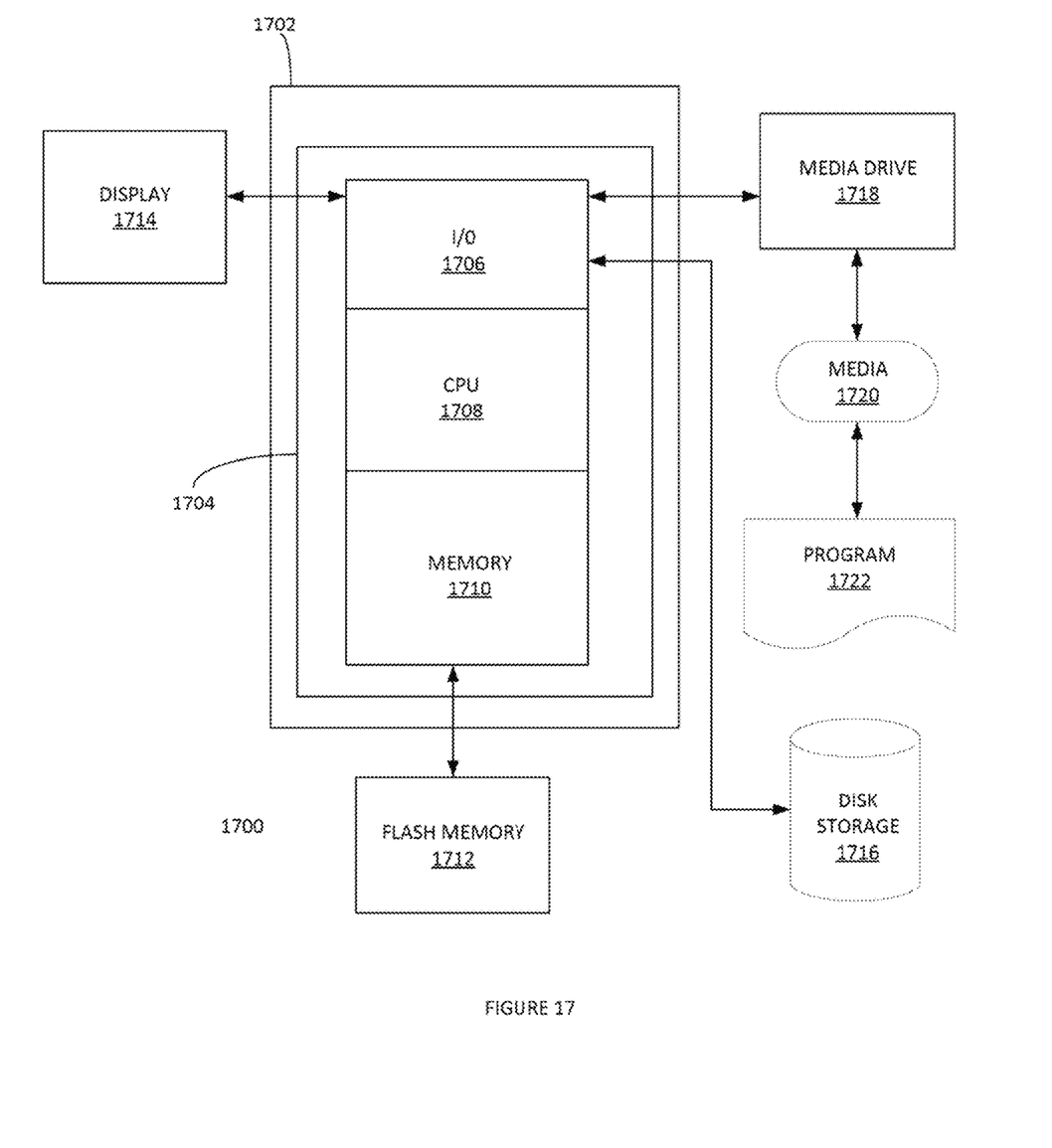
FIG. 17 depicts an exemplary computing system that can be configured to perform any one of the processes provided herein.

FIG. 17 depicts an exemplary computing system 1700 that can be configured to perform any one of the processes provided herein. In this context, computing system 1700 may include, for example, a processor, memory, storage, and I/O devices (e.g., monitor, keyboard, disk drive, Internet connection, etc.). However, computing system 1700 may include circuitry or other specialized hardware for carrying out some or all aspects of the processes. In some operational settings, computing system 1700 may be configured as a system that includes one or more units, each of which is configured to carry out some aspects of the processes either in software, hardware, or some combination thereof.

FIG. 17 depicts computing system 1700 with a number of components that may be used to perform any of the processes described herein. The main system 1702 includes a motherboard 1704 having an I/O section 1706, one or more central processing units (CPU) 1708, and a memory section 1710, which may have a flash memory card 1712 related to it. The I/O section 1706 can be connected to a display 1714, a keyboard and/or other user input (not shown), a disk storage unit 1716, and a media drive unit 1718. The media drive unit 1718 can read/write a computer-readable medium 1720, which can contain programs 1722 and/or data. Computing system 1700 can include a web browser. Moreover, it is noted that computing system 1700 can be configured to include additional systems in order to fulfill various functionalities. Computing system 1700 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 18:
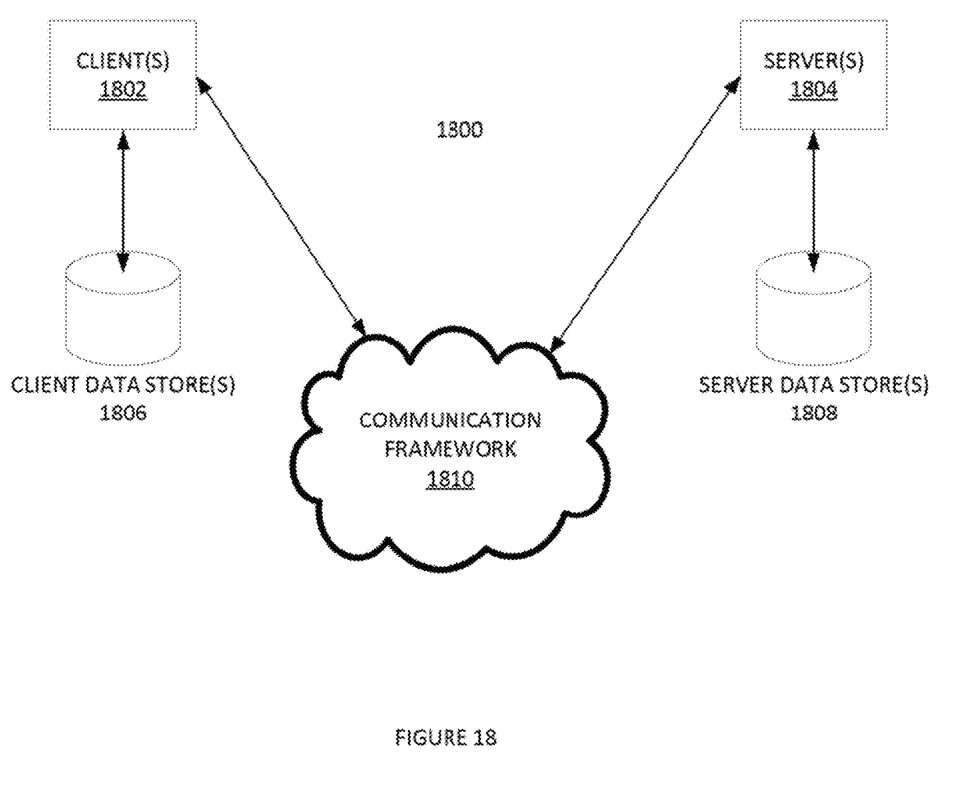
FIG. 18 is a block diagram of a sample computing environment that can be utilized to implement various embodiments.

FIG. 18 is a block diagram of a sample computing environment 1800 that can be utilized to implement various embodiments. The system 1800 further illustrates a system that includes one or more client(s) 1802. The client(s) 1802 can be hardware and/or software (e.g., threads, processes, computing devices). The system 1800 also includes one or more server(s) 1804. The server(s) 1804 can also be hardware and/or software (e.g., threads, processes, computing devices). One possible communication between a client 1802 and a server 1804 may be in the form of a data packet adapted to be transmitted between two or more computer processes. The system 1800 includes a communication framework 1810 that can be employed to facilitate communications between the client(s) 1802 and the server(s) 1804. The client(s) 1802 are connected to one or more client data store(s) 1806 that can be employed to store information local to the client(s) 1802. Similarly, the server(s) 1804 are connected to one or more server data store(s) 1808 that can be employed to store information local to the server(s) 1804. In some embodiments, system 1800 can instead be a collection of remote computing services constituting a cloud-computing platform.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

The invention claimed is:

1. A computerized method for implementing a virtualized training session user interface (UI) with respect to a production software UI comprising:
    providing a production software application;
    creating a guide process by:
    providing a set of JSON files,
        providing a set of images, wherein the images include a set of images with a plurality of guide bubbles and another set of images without a plurality of bubbles,
        providing set of workflow components, and
        with a machine learning algorithm and the set of JSON files, the set of images, and the set of workflow components; creating the guide process;
    wherein the guide process comprises:
        displaying a guide bubble window on a specified location of the production software UI;
        implementing a virtualized training session relevant to the specified location of the production software UI by:
        determining a set of x/y axis values of the production software UI that a user clicks on to access and input data into the guide bubble window,
        determining a set of associated input field values of the x/y axis values,
        capturing the production software UI based on the set of x/y axis values of the production software UI and the associated input field values,
        with the captured production software UI, mimicking the production software UI on top of an image as a virtualized version production software UI, wherein the guide bubble window opens the virtualized version of the production software UI,
        implementing a virtualized version of the underlying production software of a virtualized version of a production software UI,
        dynamically determining a workflow and a tutorial content of the guide bubble window is determined dynamically using one or more specified machine-learning algorithms, wherein the guide bubble window comprises a set of instructions for the workflow and the tutorial content, wherein the guide provides the workflow and the set of tutorial content via the guide bubble window,
        displaying the guide bubble window as a virtual lab placed on top of the image of the guide bubble window, wherein the virtual lab comprises a same appearance as the production software application UI, wherein the virtual lab comprises the virtualized-version of the production software application within the bubble window, wherein the virtual lab enables the user to interact with a virtualized version of a product software data of the production software application; and
        receiving a user input comprising a learning-related data inside the virtual lab of the guide bubble window.

2. The computerized method of claim 1, wherein the set of associated input field values of the x/y axis values comprises a drop-down value.

3. The computerized method of claim 1, wherein the set of associated input field values of the x/y axis values comprises a check-box value.

* * * * *